April 1, 1924.
H. McDONALD
WAREHOUSE TRUCK
Filed Feb. 14, 1922
1,488,760
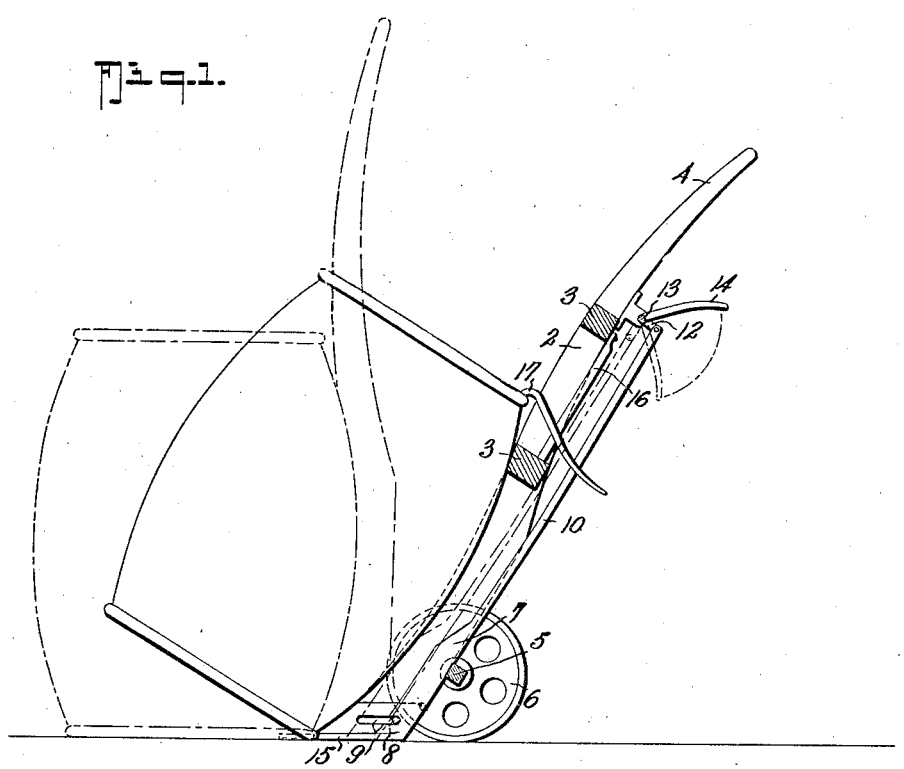
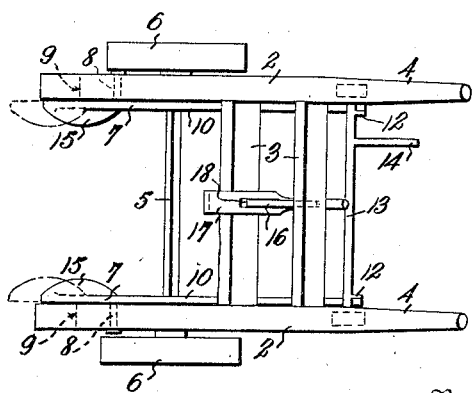
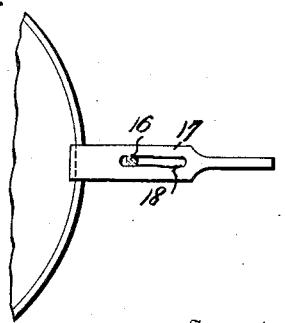
Inventor
Hector McDonald.
By Fred G Dieterich
Attorney Patented Apr. 1, 1924.

1,488,760

UNITED STATES PATENT OFFICE.

HECTOR McDONALD, OF VANCOUVER, BRITISH COLUMBIA, CANADA.

WAREHOUSE TRUCK.

Application filed February 14, 1922. Serial No. 536,420.

*To all whom it may concern:*

Be it known that I, HECTOR McDONALD, citizen of the Dominion of Canada, residing at Vancouver, in the Province of British Columbia, Canada, have invented certain new and useful Improvements in Warehouse Trucks, of which the following is a specification.

This invention relates to a warehouse truck which has been particularly designed for the conveyance of such articles as barrels or drums, facilitating the loading of the same on the truck from the ground, and maintaining them steady on the truck.

The invention is particularly described in the following specification, reference being made to the drawings by which it is accompanied, in which:

Fig. 1 is a vertical longitudinal section, showing the truck as applied to a cask, the dash and double dot showing the primary position of loading.

Fig. 2 is a plan of the same, and

Fig. 3 is an enlarged detail of the provision connecting the upper end of the load to the truck.

The frame of the truck is of the usual construction having side members 2 maintained the required distance apart by cross rails 3 toward the handled ends 4, and adjacent the other end by the axle 5 fixed across the undersides of 2 on the projecting ends of which axle the wheels 6 are mounted.

The ends of the side members 2 adjacent the wheels are bevelled to correspond with the floor line when the truck is upended on its wheels at approximately sixty degrees from the floor line, as shown in Fig. 1, and across the inner side of each end, a strip of sheet metal is recessed, in which is an elongated slot 9 parallel with the end of the frame 2.

The slot 9 of the plate is carried also through the thickness of the frame 2 to its outer side and through it projects a stud 8 secured in a metal bar 7, the lower end of which bar is bent, as at 15, to conform to the bevelled end of the side member 2 and to project inward and forward from the bar 7. While the studs 8 are at the backward limit of their slots, the toe pieces 15 are within the ends of the side members 2; but if the bars 7 are endwise moved to take the pins 8 to the other ends of the slots 9, as shown by dot and dash lines in Figs. 1 and 2, the feet 15 project beyond the ends of the truck frame.

These plates 15 are retained in contact with the side members 2 by washers secured on their outer ends.

The upper end of each bar 7 is drawn out to form a rod 10 which extends to adjacent the upper rail 3 where they are connected to arms 12 secured to and projecting from a rocking shaft 13 mounted in bearings secured to the underside of the side members 2 and extending across between them.

On this rocking shaft a handle lever 14 is secured in a position convenient for the truck user and adapted, when the lever 14 is moved down, as indicated by the dot and dash lines in Fig. 1, to endwise move the bars 7 and by engagement of their pins 8 in the slots 9 to project the foot-like ends 15 horizontally beyond the ends of the side frames.

In the middle line of the truck a square guide rod 16 is secured to, and extends between, the cross rails 3, and on this rod 16 is slidably mounted a hook member 17, the rod passing through an elongated slot 18 in the body of the hook member, which member is extended below the rod 16 to provide a handle hold for the user.

In use, the bars 7 with their toe piece 15 are normally withdrawn within the ends of the members 2 of the truck with the hook 17 resting against the lower cross rail 3. When the truck is upended against a barrel or cask, as shown by the dash and double dot lines in Fig. 1, the hook 17 is lifted upward on its guide rod 16 to engage the upper rim of the barrel and thereby connect it to the frame of the truck. The truck and its load are then drawn downward toward the position shown by the full lines in Fig. 1, and, as the circular bottom end of the barrel is tilted from the ground, the handle 14 is moved down to the position represented by dot and dash lines, when the lower end of the side bars 7 guided in the slots 9 are projected under the bottom end of the barrel and provide a rest supporting the lower end of the barrel against endwise movement on the truck.

Barrels and the like are awkward for one man to handle with a truck and particularly so when they stand close together or against a wall where the upper ends cannot be canted from the truck in the usual manner. By the use of this truck they may be readily canted toward the truck and the toe pieces being one on each side of the bottom of the barrel and clear of the intervening medial portion on which the barrel is canted, they may be projected under the bottom to lift the barrel on the truck.

Having now particularly described my invention, I hereby declare that what I claim as new and desire to be protected in by Letters Patent, is:

1. A warehouse truck, comprising the combination with a truck frame, the side members of which are handled at one end and provided with wheels adjacent the other, and toe members slidably mounted on the side members of the frame at the wheeled end and adapted to withdraw within the depth of said side members or project beyond the upper sides thereof in line with the end of each side frame, and means for manually projecting said toe members.

2. A warehouse truck, comprising the combination with a truck frame, the side members of which are handled at one end and provided with wheels adjacent the other, and toe members slidably mounted on the side members of the frame at the wheeled end and adapted to withdraw within the depth of said side members or project beyond the upper sides thereof in line with the end of each side frame, and means operable from the handled end of the truck for manually projecting said toe members.

3. A warehouse truck, comprising the combination with a truck frame, the side members of which are handled at one end and provided with wheels adjacent the other, a toe member movably slidably mounted on each side member of the truck to project beyond the upper side thereof at an obtuse angle with the underside of the same, and means adjacent the handled end of the truck for endwise moving the toe member to project it from or withdraw it beneath the upper side of the truck frame.

4. A warehouse truck, comprising the combination with a truck frame, the side members of which are handled at one end and provided with wheels adjacent the other, a toe plate having a stud slidably movable in an inclined slot in the lower or wheeled end of each side member and susceptible of being projected endwise outward therefrom, a rocking shaft extending across the truck frame and having an arm on each side to which the ends of the toe plates are connected, and a handled lever by which the shaft may be moved to project or withdraw the toe plate.

5. A warehouse truck, comprising the combination with a truck frame the side members of which are handled at one end and provided with wheels adjacent the other, the end of the side members projecting beyond the wheels being angled to contact with the floor when upended on the wheels and support the truck frame at an acute angle to the floor line, members connected to the side members of the truck frame and provided with feet projecting therefrom in the approximate plane of the angled ends, and means manually operated from the handled end of the truck for slidably projecting the footed ends of these side connected members beyond the upper side of the truck frame.

In testimony whereof I affix my signature.

HECTOR McDONALD.